Patented Jan. 26, 1937

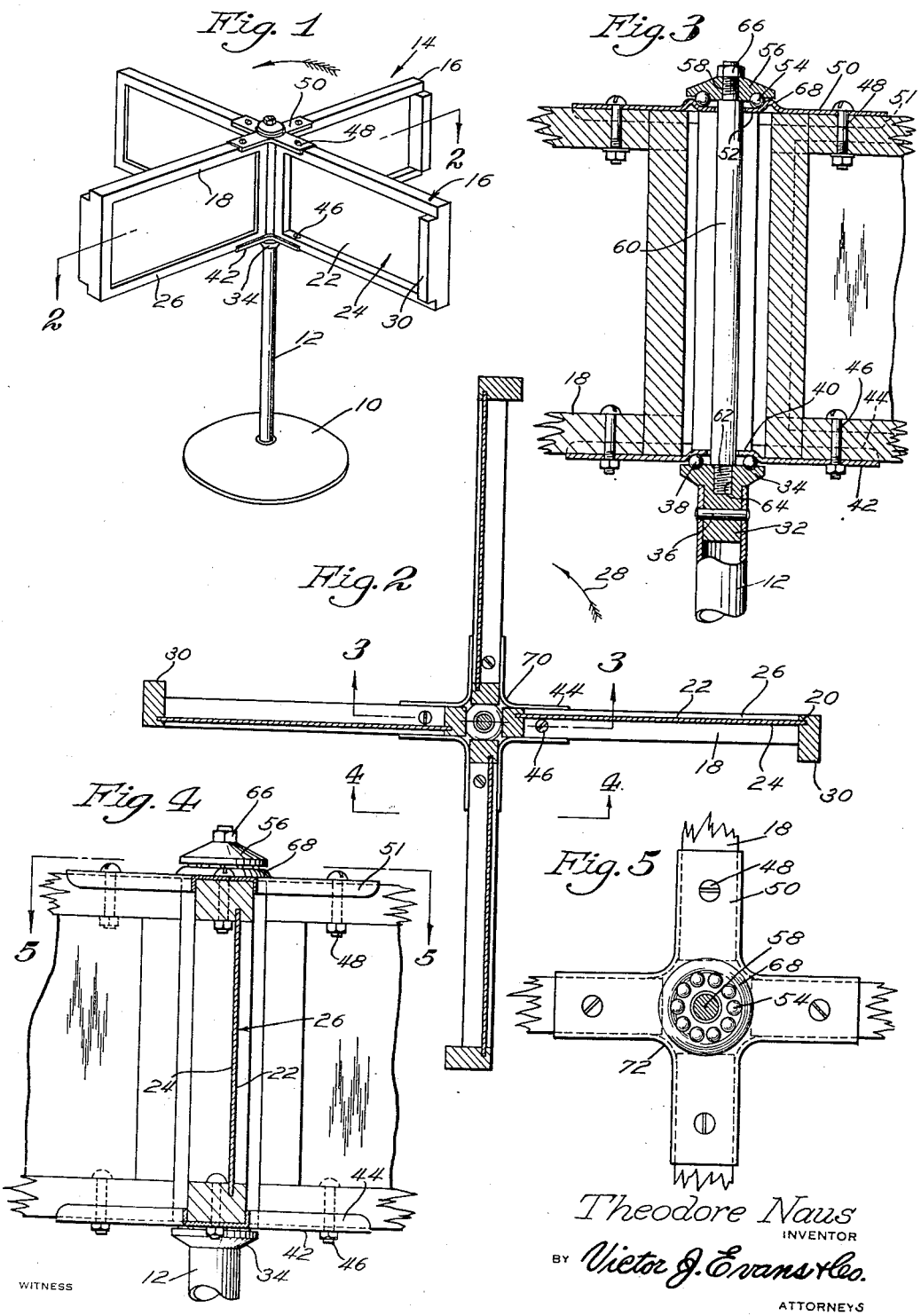

2,069,110

UNITED STATES PATENT OFFICE 2,069,110

TRAVELING SIGN

Theodore Naus, Ionia, Mich.

Application June 22, 1936, Serial No. 86,649

3 Claims. (Cl. 40—39)

My invention relates to the art of advertising, and has among its objects and advantages the provision of an improved rotatable sign.

In the accompanying drawing:

Fig. 1 is a perspective view of the sign;

Fig. 2 is a sectional view along the line 2—2 of Fig. 1;

Fig. 3 is an enlarged sectional detail view taken along the line 3—3 of Fig. 2;

Fig. 4 is a sectional view taken along the line 4—4 of Fig. 2; and

Fig. 5 is a sectional view taken along the line 5—5 of Fig. 4.

In the embodiment selected to illustrate my invention, I make use of a base 10 for supporting a standard 12 to the upper end of which I rotatably mount a traveling sign 14. This sign comprises four wings 16 connected as a unit for rotation about a vertical axis.

Specifically, each wing 16 comprises a frame 18 of rectangular configuration, which frame is grooved at 20 for the reception of a panel 22 carrying advertising matter.

Referring to Fig. 2, it will be noted that the panels 22 are offset and cooperate with the frame 18 to provide deep air pockets 24 upon one side and shallow air pockets 26 upon the other. Arrow 28 indicates the direction of rotation. The shallow pockets 26 offer less resistance to the wind than the effective forces of the wind within the deep pockets. However, the shallow pockets do offer some resistance, which resistance is of such a nature as to cause the sign to rotate at substantially the same speed regardless of wind velocity. Each frame 18 includes an extension 30 at the outer end thereof, which extension provides increased wind receiving surface for propelling purposes.

Standard 12 is preferably in the nature of a metallic tube within the upper end of which I fixedly secure the shank 32 of a ball race 34. The shank may be made secure by a rivet 36 which passes through the shank and the tube. Balls 38 are placed in the race 34 and support the upper ball race 40 which terminates in extensions 42 upon which the frames 18 are mounted. Flanges 44 are carried by the extensions 42 and embrace the vertical sides of the frames 18. Bolts 46 pass through the frames 18 and extensions 42.

Similarly, the upper horizontal reaches of the frames 18 are bolted at 48 to extensions 50 projecting from the ball race 52. These extensions include flanges 51 which embrace the vertical sides of the upper reaches of the frames 18. Balls 54 run in the race 52 and in the upper ball race 56 mounted upon the shank 58 of a shaft 60 which has a threaded shank 62 at its lower end anchored in the threaded bore 64 in the ball race 34. Shank 58 is provided with threads cooperating with the nut 66 for holding the ball race 56 in position. The ball race 52 includes a circular bead 68 which cooperates with the ball race 56 for determining the path of the balls 54. The two ball races in connection with the balls 54 support the upper end of the assembly in concentric relation with the shaft 60, and the lower end is maintained concentrically therewith because of the ball races 34 and 40, and the balls 38.

The weight of the traveling sign 14 is carried by the lower bearing while the upper bearing serves as a balancing element. Because of the bearings, the sign is highly sensitive to slight winds. Uniform speed is attained because of the pockets 24 and 26.

In Fig. 2, the flanges 44 are connected in pairs by the curved reach 70, while the flanges 51 are connected by similar curved reaches 72. Thus, the extensions 42 and 50 are reinforced by the flanges, which permits the extensions to be made from relatively thin material.

Without further elaboration, the foregoing will so fully explain my invention that others may, by applying current knowledge, readily adapt the same for use under various conditions of service.

I claim:

1. A device of the type described comprising a standard, a plurality of frames rotatably mounted on said standard, a sign panel positioned within each frame, said panels being arranged and offset in parallel relation with their respective frames, to provide a deep air pocket on one side of each frame and a shallow air pocket on the opposite side.

2. A device of the type described comprising a standard, a plurality of frames rotatably mounted on said standard, a sign panel positioned within each frame, said panels being arranged and offset in parallel relation with their respective frames, to provide a deep air pocket on one side of each frame and a shallow air pocket on the opposite side, and extensions carried by the free ends of the frames and cooperating with the deep air pockets to propel the sign.

3. A device of the type described comprising a base including pivot means, a rotatable sign mounted on said pivot means, said sign including a plurality of wings, each wing having air pockets of different capacities upon opposite sides, said air pockets operating to rotate the sign in a given direction at a uniform speed regardless of wind velocity.

THEODORE NAUS.